United States Patent [19]

Salon et al.

[11] 4,268,883
[45] May 19, 1981

[54] REVERSE VOLTAGE PROTECTION FOR BRUSHLESS EXCITATION SYSTEMS

[75] Inventors: Sheppard J. Salon, Pittsburgh; Lon W. Montgomery, Monroeville, both of Pa.

[73] Assignee: Westinghouse Electric Corp., Pittsburgh, Pa.

[21] Appl. No.: 953,654

[22] Filed: Oct. 23, 1978

[51] Int. Cl.³ .............................................. H02K 19/00
[52] U.S. Cl. ...................................... 361/21; 361/56; 361/91; 361/33; 310/68 C
[58] Field of Search ................ 361/21, 56, 91, 33; 310/68 C, 68 D

[56] References Cited

U.S. PATENT DOCUMENTS

| 3,314,001 | 4/1967 | Brockman | 361/21 |
| 3,454,860 | 7/1969 | Burkett et al. | 361/21 |
| 3,697,807 | 10/1972 | Christ | 361/21 |
| 3,838,303 | 9/1974 | Ernst | 310/68 D |
| 3,845,369 | 10/1974 | Heyne | 310/68 D |
| 4,079,276 | 3/1978 | Küter | 310/68 D |
| 4,156,172 | 5/1979 | Hucker et al. | 361/21 |
| 4,164,705 | 8/1979 | Whitney et al. | 310/68 D |

Primary Examiner—J. D. Miller
Assistant Examiner—L. C. Schroeder
Attorney, Agent, or Firm—G. H. Telfer

[57] ABSTRACT

A protective circuit is provided for a brushless excitation system using a rotating rectifier assembly to supply field excitation to a synchronous generator. A thyristor is connected across the generator field winding and made conductive when the field winding voltage exceeds a preset level to shunt the field winding and protect the rectifier diodes against high reverse voltages.

17 Claims, 5 Drawing Figures

REVERSE VOLTAGE PROTECTION FOR BRUSHLESS EXCITATION SYSTEMS

BACKGROUND OF THE INVENTION

The present invention relates to brushless excitation systems for alternating current generators, and more particularly to protective means for protecting the rectifier diodes of such a system against reverse voltages.

Brushless excitation systems are frequently used for supplying direct current field excitation to large alternating current generators. Such an excitation system includes an alternating current exciter having a stationary field structure and a rotating armature member. A rotating rectifier assembly is carried on a common shaft with the exciter armature and is connected thereto to provide a direct current output. The output of the rectifier is supplied to the field winding of the main generator which is carried on the rotor and rotates with the exciter armature and rectifier assembly. In this way, an excitation system is provided which requires no commutator or slip rings and no sliding contacts.

Such excitation systems have many advantages and are widely used. Certain problems, however, may occur in the operation of these systems. For example, if the main generator loses synchronism and the rotor begins to slip poles, or if the rotor speed deviates from synchronous speed for any reason, the rotating magnetic field produced by the three-phase stator currents causes induced currents to appear in the field winding which are superimposed on the normal direct current excitation. If the amplitude of these induced currents is greater than that of the existing direct current excitation, the resultant current in the field winding will attempt to reverse and go negative as the induced current approaches its negative maximum. Since the field winding is connected across a rectifier bridge, the rectifier diodes block reverse current flow through the field winding. The reverse biased diodes, however, have a large impedance, and very high reverse voltages can occur across the rectifier bridge under these conditions. These voltages can be high enough to damage the diodes. The diodes should, therefore, be protected from dangerously high reverse voltages.

SUMMARY OF THE INVENTION

The present invention is directed to the protection of the rectifier diodes of a brushless excitation system from excessive reverse voltages by shunting the field winding when such voltages tend to occur.

In accordance with the invention, a brushless excitation system is provided which has switching means connected across the field winding and the rectifier bridge and adapted to become conductive in response to a voltage of predetermined magnitude appearing across the field winding. The switching means is preferably a thyristor, or other suitable semiconductor device, with a gate electrode energized from a voltage divider responsive to the field voltage to fire the thyristor at the desired voltage level. Since the dangerous reverse voltages are much higher than the voltage normally existing across the field winding, the thyristor can readily be fired at a voltage level which is adequate to protect the rectifier diodes but high enough to prevent any possibility of shunting the field winding under normal conditions. The thyristor or, if necessary, a number of parallel-connected thyristors, and the voltage divider which provides the firing voltage can desirably be mounted in a flange member inserted between the exciter and generator rotor shafts which usually have central bores through which the field leads pass. Such an arrangement provides a compact structure which does not require the mounting of any additional devices on the rectifier diode wheels themselves where space is usually not readily available.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
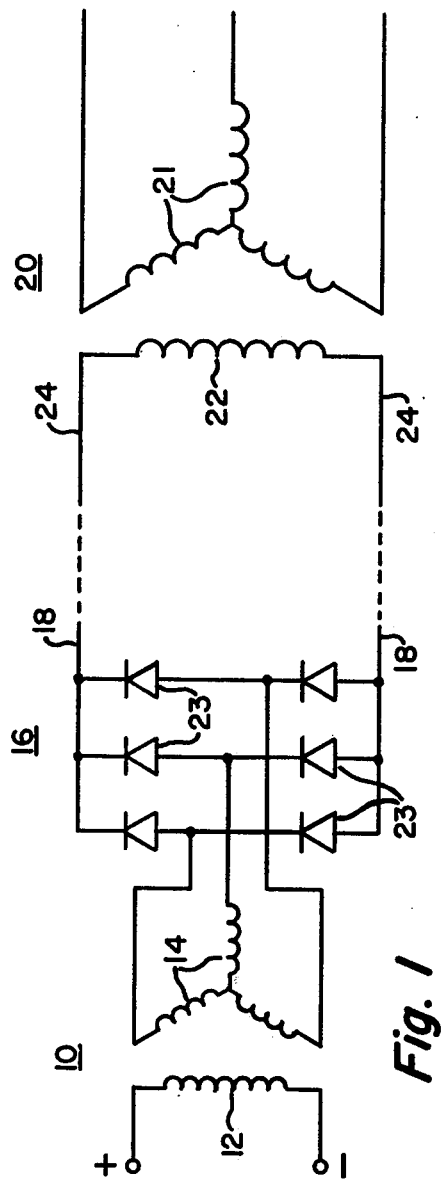
FIG. 1 is a schematic diagram showing the basic circuit of a typical brushless excitation system.

FIG. 1 is a schematic diagram showing the basic circuit of a brushless excitation system as used in large synchronous generators. Such a system includes an alternating current exciter 10 which has a stationary field winding 12 and a rotating armature winding 14. The field winding 12 is provided with direct current excitation from any suitable source such as a pilot exciter, or a voltage regulator circuit, of any desired type and is carried on the stator member of the exciter 10. The armature winding 14 is shown as a three-phase winding but may be of any suitable type, and the armature is carried on a rotor member which is mounted on an exciter shaft. A rotating rectifier assembly 16 is also mounted on the same shaft for rotation with the armature winding 14 which is directly connected to the rectifier bridge 16 to provide a direct current output on the leads 18. The main generator 20 is a synchronous generator of any usual type having a stator winding 21 and a field winding 22. The field winding 22 is carried on the rotor of the machine 20 and is provided with direct current excitation from the rectifier leads 18 which are connected directly to the leads 24 of the field winding 22.

In the usual arrangement, the exciter shaft which carries the winding 14 and rotating rectifier assembly 16 is aligned with and coupled to the generator rotor shaft which carries the field winding 22. The rectifier bridge 16 includes a plurality of diodes 23 which may be connected in a three-phase bridge, as shown, or in any other suitable circuit configuration. The diodes 23 are mounted on diode wheels carried on the exciter shaft which support the diodes and carry any necessary auxiliary devices such as capacitors and fuses. The leads 18 usually extend through an axial bore in the exciter shaft and are connected to the field leads 24 which extend through a similar axial bore in the generator rotor shaft. The two shafts are coupled together and the leads 18 and 24 are connected together at the coupling to complete the field winding circuit. The structure of the exciter armature and of the rotating rectifier assembly 16 has not been shown as any desired construction may be used. Suitable rectifier structures are disclosed in Hoover U.S. Pat. No. 3,371,235, Dillman et al U.S. Pat. No. 3,852,628 and Petersen et al U.S. Pat. No. 3,872,335.

Brushless excitation systems of the general type shown in FIG. 1 are extensively used for large alternating current generators and offer many advantages because of the elimination of slip rings and commutators. It may sometimes happen, however, that the main generator 20 loses synchronism for some reason, thus operating at a speed other than synchronous speed. When such a condition occurs, the rotating magnetic field in the airgap, attributable to the polyphase stator currents, induces low frequency currents in the field winding because of the difference in rotational speeds between the magnetic field and the rotor winding. These induced currents are superimposed on the normal direct current field excitation supplied by the rectifier 16. If the magnitude of the induced currents is greater than that of the field current, the resultant current will attempt to go negative in each cycle of the induced current. Since the field winding 22 is connected directly across the rectifier bridge 16, however, the rectifier diodes 23 block the flow of reverse current. The reverse biased diodes have high impedance, and high reverse voltages appear across the diodes 23 under these conditions. The reverse voltages which may occur under these conditions can easily be high enough to result in serious damage to the diodes 23.

Figure 2:
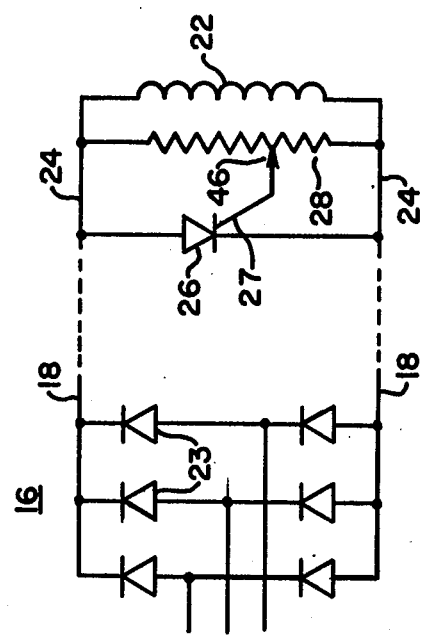
FIG. 2 is a schematic diagram of the rotating portion of an excitation system embodying the invention.

In accordance with the present invention, the diodes 23 are protected from high reverse voltages by shunting the field winding 22 to provide a path for reverse current and thus to hold the voltage down to a low value. FIG. 2 shows a preferred arrangement for accomplishing this result. This figure shows the rotating portion of a brushless excitation system, such as described above, with the addition of shunting or switching means across the field winding 22. In the preferred embodiment shown, this switching means is a semiconductor device, shown as a thyristor 26 having its anode and cathode terminals connected directly across the field winding 22. Thyristor 26 also has a gate electrode 27, and voltage for firing the thyristor is applied to the gate 27 by means of a voltage divider 28, which is preferably a tapped resistor also connected directly across the field winding 22.

Under normal conditions, the thyristor 26 is non-conductive since the gate voltage will normally be too low to turn ON the thyristor so that it has no effect and the circuit operates as described above to supply direct current excitation to the field winding 22. Under asynchronous conditions, as mentioned above, the induced currents in the field winding 22 will attempt to reverse if they are of sufficient amplitude, although reverse current flow is blocked by the diodes 23. The corresponding voltage across the voltage divider 28, however, becomes high enough to raise the voltage at the point to which the gate 27 is connected sufficiently to fire the thyristor 26. The thyristor, thus made conductive, provides a path for the reverse current attempting to flow in the field winding circuit. Since the forward resistance of the thyristor during conduction is quite low, the voltage across the winding 22 is kept low, and the diodes 23 are protected against dangerously high reverse voltages. The usual voltages in a system of this type are such that the thyristor can be reliably fired at the desired time. Thus, in normal operation, the voltage across the field winding 22 is usually of the order of 1000 volts, while diodes 23 of the type usually used may be damaged if the reverse voltage across them reaches about 2200 volts. There is, therefore, a wide margin between the normal voltage and dangerous voltages. Two diodes are usually used in series, and the thyristor 26 must, therefore, be fired before the reverse voltage reaches approximately 4000 volts. As the normal field voltage is only about 1000 volts, the voltage divider 28 can be set to fire the thyristor at a threshold voltage of 1500 volts, for example, which is well below the maximum safe voltage, even for a single diode, but which is high enough to involve no risk of the diode being fired during normal operation. A very reliable and relatively simple means is thus provided for protecting the rectifier diodes against dangerous reverse voltages. The thyristor 26 will, of course, continue to conduct after it is fired and suitable means may be provided to turn the thyristor OFF when the field voltage returns to normal. The turn-off means has not been shown, however, as such circuits are known in the art and are not a part of the invention.

Figure 3:
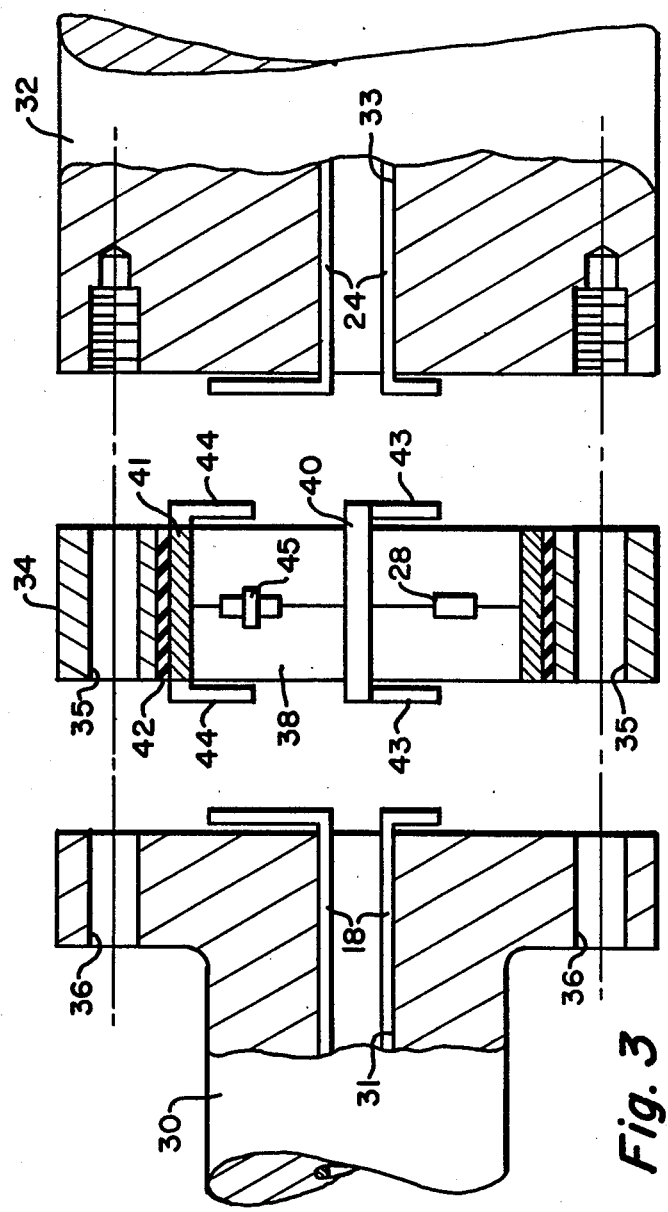
FIG. 3 is a somewhat diagrammatic exploded view showing a preferred physical embodiment of the invention.
Figure 4:
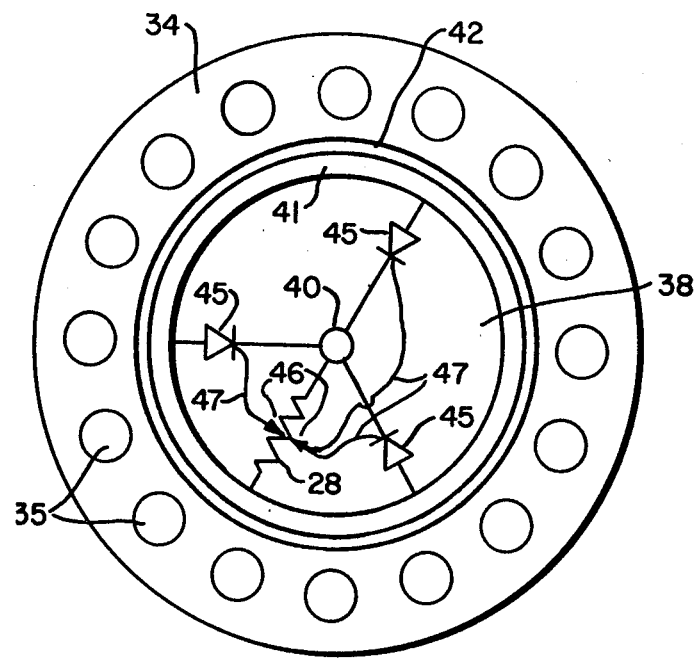
FIG. 4 is a transverse elevational view of a flange member shown in FIG. 3.

As previously mentioned, the diode wheels which carry the rectifier diodes 23, in the usual construction, also support necessary auxiliary equipment such as capacitors and fuses, and little space is available for mounting additional devices such as the protective device of the present invention. FIGS. 3 and 4, therefore, show a preferred means for mounting the protective shunting device away from the diode wheels. As previously mentioned, and shown in the above-mentioned patents, the diode wheels are carried on an exciter shaft. The exciter shaft 30 (FIG. 3) has a central axial bore 31 extending through it, and the insulated output leads 18 of the rectifier bridge 16 are disposed in this bore. Similarly, the main generator 20 has a shaft 32 on which the rotor which carries the field winding 22 is supported, and the shaft 32 has a central axial bore 33 in which the field winding leads 24 are disposed. The shafts 30 and 32 are axially aligned and are coupled together in driving relation so that the exciter 10 is driven by the main generator.

In accordance with the invention, the driving connection between the shafts 30 and 32 is made by means of a flange member 34 which may be a circular element provided with bolt holes 35 through which bolts (not shown) may pass to bolt the flange 36 of the exciter shaft 30 to the generator shaft 32. The flange member 34 completes the driving connection between the shafts and also serves to carry the switching means for shunting the field winding 22 and to provide means for making the electrical connections between the exciter leads 18 and field winding leads 24. For this purpose, the flange 34 is an annular member having a large central opening or space 38. Two concentric, radially spaced, conducting elements are provided in this space for making the electrical connections. As shown in FIGS. 3 and 4, these elements consist of a central copper rod 40 supported in any suitable manner on the axis of the flange 34, and a cylindrical copper rim 41 extending around the circumference of the space 38 and insulated from the flange 34 by a layer of insulation 42. The rod 40 has lugs or terminal elements 43 at opposite ends which are connected to one of the rectifier output leads 18 and to one of the field leads 24, respectively. Similarly, the rim 41 has lugs 44 at opposite sides respectively connected to the other rectifier lead 18 and the other field lead 24.

Figure 5:
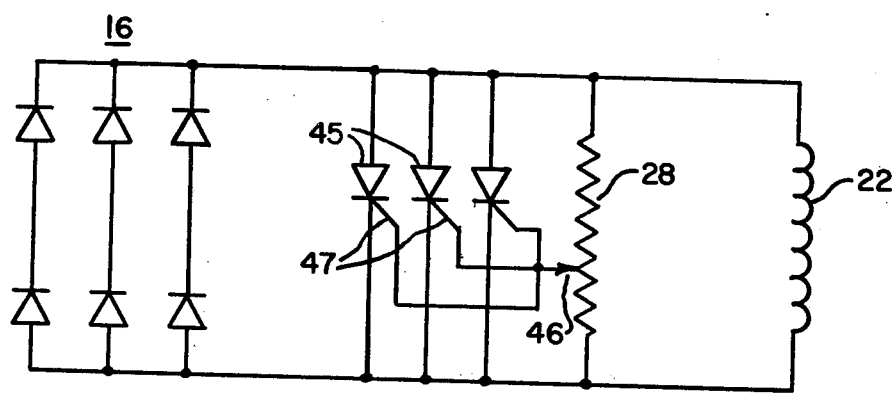
FIG. 5 is a schematic diagram of a slightly modified embodiment of the invention.

One or more thyristors 45 are mounted in the space 38 of the flange 34 with their anode and cathode terminals connected to the rim 41 and the central rod 40, respectively, so as to be connected across the field winding 22 as previously described. The thyristors 45 may be of any suitable or desired type and have been shown only diagrammatically in FIGS. 3 and 4. The voltage divider 28 is also mounted in the space 38 and connected between the central rod 40 and the rim 41. The voltage divider 28 may be a resistor of suitable size with a tap 46 which may be made adjustable, if desired, and which sets the voltage applied to the gate electrodes 47 of the thyristor or thyristors 45 to fire them when the desired maximum voltage across the field winding is exceeded. A single thyristor 26 has been shown in the schematic diagram of FIG. 2, but in practice, it will usually be desirable to utilize several thyristors in parallel to provide the desired current capacity. These may be arranged as in FIG. 5 which shows three thyristors 45 connected in parallel with their gate electrodes 47 connected together and connected to a common tap 46 on the voltage divider 28 so as to be fired simultaneously. Any desired or necessary number of thyristors 45 can thus be connected in parallel across the field winding 22.

It will now be apparent that an effective means has been provided for shunting the rectifier diodes and field winding in a brushless excitation system in response to high reverse voltages. In this way, the field winding voltage is kept to a low value under conditions where reverse voltages can occur, and the diodes are effectively protected. It will be understood that any necessary number of thyristors could be used to provide the necessary current capacity, or any other suitable type of semiconductor device could be used that can be made conductive at a desired voltage level. The thyristors or other devices may be arranged in any desired manner and may be mounted in any suitable location. The arrangement described above, however, is a very desirable and compact arrangement which puts the shunting means in a protected place without requiring additional equipment on the diode wheels themselves.

What is claimed is:

1. In a brushless excitation system for a synchronous generator having a rotor member including a shaft carrying a field winding, the combination comprising:
   an alternating current exciter having an armature winding carried on an exciter shaft having a central bore and rotatable with said rotor member;
   a rectifier assembly rotatable with the rotor member and connected to said armature winding;
   means for connecting the rectifier assembly to said field winding to supply direct current excitation thereto; and
   switching means responsive to the voltage across the field winding for shunting the field winding in response to voltage exceeding a predetermined value;
   said switching means mounted within said bore.

2. The combination defined in claim 1 in which said switching means is a thyristor connected across the field winding, and means for making said thyristor conductive when the voltage across the field winding rises to said predetermined value.

3. In a brushless excitation system for a synchronous generator having a rotor member carrying a field winding, the combination comprising:
   an alternating current exciter having an armature winding rotatable with said rotor member; a rectifier assembly rotatable with the rotor member and connected to said armature winding;
   means for connecting the rectifier assembly to said field winding to supply direct current excitation thereto;
   switching means responsive to the voltage across the field winding for shunting the field winding in response to voltage exceeding a predetermined value;
   said switching means including at least one thyristor connected across the field winding, and means for making said thyristor conductive when the voltage across the field winding rises to said predetermined value;
   said thyristor includes a gate electrode; and
   said conductive means includes a voltage divider connected across the field winding, and means for connecting the gate electrode to said voltage divider to fire the thyristor when the field winding voltage exceeds said predetermined value.

4. A brushless excitation system for a synchronous generator having a rotor member carrying a field winding, said system including an alternating current exciter and a rotating rectifier assembly connected thereto and carried on a common exciter shaft, said exciter shaft having a central bore, output leads for said rectifier assembly disposed in said bore, said rotor member having a shaft with a central bore therein, field leads connected to said field winding disposed in said last-mentioned bore, said exciter shaft and said rotor shaft being aligned for rotation together, flange means coupling said shafts together, said flange means including concentric, radially spaced, conducting members, each of said conducting members being connected to one of said rectifier output leads and to one of said field leads to electrically connect them together, and shunting means electrically connected between said concentric members, said shunting means being normally non-conducting and being adapted to become conductive in response to voltage across said field leads in excess of a predetermined value.

5. A brushless excitation system defined in claim 4 in which said shunting means is a semiconductor device having anode and cathode electrodes connected to said concentric members, and means for making said device conductive when the voltage across the field leads exceeds said predetermined value.

6. A brushless excitation system as defined in claim 5 in which said semiconductor device is a thyristor having a gate electrode, and means connected to said gate electrode for firing the thyristor when the voltage across the field leads exceeds said predetermined value.

7. A brushless excitation system for a synchronous generator having a rotor member carrying a field winding, said rotor member having a shaft with a central bore therein, field leads connected to said field winding disposed in said bore, said system including:
   an alternating current exciter and a rotating rectifier assembly connected thereto and carried on a common exciter shaft, said exciter shaft having a central bore, output leads for said rectifier assembly disposed in said bore, said exciter shaft and said rotor shaft being aligned for rotation together, flange means coupling said shafts together, said flange means including concentric, radially spaced, conducting members, each of said conducting members being connected to one of said rectifier output leads and to one of said field leads to electrically connect them together, and shunting means electrically connected between said concentric members, said shunting means being normally nonconducting and being adapted to become conductive in response to voltage across said field leads in excess of a predetermined value, said shunting means including a thyristor having a gate electrode, and a resistor connected between said concentric members, and means for connecting said gate electrode to an intermediate point of said resistor to fire the thyristor when the voltage across the resistor exceeds a predetermined value.

8. A brushless excitation system for a synchronous generator having a rotor member carrying a field winding, said rotor member having a shaft with a central bore therein, field leads connected to said field winding disposed in said bore, said system including:

an alternating current exciter and a rotating rectifier assembly connected thereto and carried on a common exciter shaft, said exciter shaft having a central bore, output leads for said rectifier assembly disposed in said bore, said exciter shaft and said rotor shaft being aligned for rotation together, flange means coupling said shafts together, said flange means including concentric, radially spaced, conducting members, each of said conducting members being connected to one of said rectifier output leads and to one of said field leads to electrically connect them together, and shunting means electrically connected between said concentric members, said shunting means being normally nonconducting and being adapted to become conductive in response to voltage across said field leads in excess of a predetermined value, said shunting means including a plurality of thyristors connected in parallel between said concentric members, and means for connecting the gate electrodes of all of said thyristors to fire the thyristors when the voltage across the field leads exceeds said predetermined value.

9. A brushless excitation system as defined in claim 8 including a voltage divider connected between the concentric members, and means for connecting the gate electrodes of all the thyristors to a common point of the voltage divider.

10. In a brushless excitation system for a synchronous generator having a rotor member including a field winding carried on a shaft axially aligned and in driving relation with an exciter shaft with a central bore extending through the shafts, the combination comprising:

(a) an alternating current exciter having an armature winding rotatable with said rotor member;

(b) a rectifier assembly rotatable with the rotor member and connected to said armature winding;

(c) means for electrically connecting the rectifier assembly to said field winding to supply direct current excitation thereto; and (d) switching means, electrically connected across the field winding, including at least one thyristor, and a voltage divider electrically connected to fire the thyristor when the field winding exceeds a predetermined value, said thyristor being mounted in said bore.

11. The combination of claim 10 wherein the voltage divider includes an adjustable resistor.

12. The combination of claim 11 wherein the thyristor has a gate electrode electrically connected to said adjustable resistor.

13. The combination of claim 10 wherein both the voltage divider and the thyristor are connected across the field winding.

14. The combination of claim 10 wherein said switching means further includes a plurality of thyristors having their gate electrodes connected together.

15. The combination of claim 1 wherein said exciter shaft includes a shaft portion and a flange member;

said flange member in driving relation between said rotor shaft and said shaft portion; and said flange member having a central opening in which said switching means is mounted.

16. The combination of claim 15 wherein said flange member further includes a central copper rod supported substantially on the axis of the flange, and a cylindrical copper rim extending around the circumference of the opening and insulated from the flange;

said rod having electrical terminal elements at opposite ends which are connected to one of the rectifier leads and to one of the field leads; and said rim having electrical terminal elements at opposite sides, respectively connected to the other rectifier lead and the other field lead.

17. The combination of claim 16 wherein the switching means is electrically connected between the rod and the rim.

* * * * *